United States Patent [19]

Aldred

[11] Patent Number: 4,750,319
[45] Date of Patent: Jun. 14, 1988

[54] GRASS CUTTING MACHINE

[75] Inventor: Edward J. Aldred, Ipswich, United Kingdom

[73] Assignee: Ransomes, Sims & Jefferies Plc, Ipswich, England

[21] Appl. No.: 871,797

[22] Filed: Jun. 9, 1986

[51] Int. Cl.[4] ............................................ A01D 75/30
[52] U.S. Cl. ............................................ 56/7; 56/249
[58] Field of Search ................ 56/6, 7, 249; 297/335, 297/344

[56] References Cited

U.S. PATENT DOCUMENTS

| | | | |
|---|---|---|---|
| 2,764,864 | 10/1956 | Kinkead | 56/7 |
| 3,542,325 | 11/1970 | Schwenk | 297/335 |
| 3,742,685 | 7/1973 | Lian et al. | 56/7 |
| 3,824,772 | 7/1974 | Sorenson et al. | 56/7 |
| 4,384,443 | 5/1983 | Hoogstrate | 56/7 |
| 4,538,400 | 9/1985 | Hotzes | 56/6 |
| 4,565,407 | 1/1986 | Brautiganm | 297/335 |

Primary Examiner—Stephen J. Novosad
Assistant Examiner—William P. Neuder
Attorney, Agent, or Firm—Browdy and Neimark

[57] ABSTRACT

A grass cutting machine has the operator seat mounted on a pivotable sub-frame which can be displaced relative to the remainder of the chassis to allow easy access to the rear cutting unit for emptying of the grass box or for minor adustments and servicing.

10 Claims, 5 Drawing Sheets

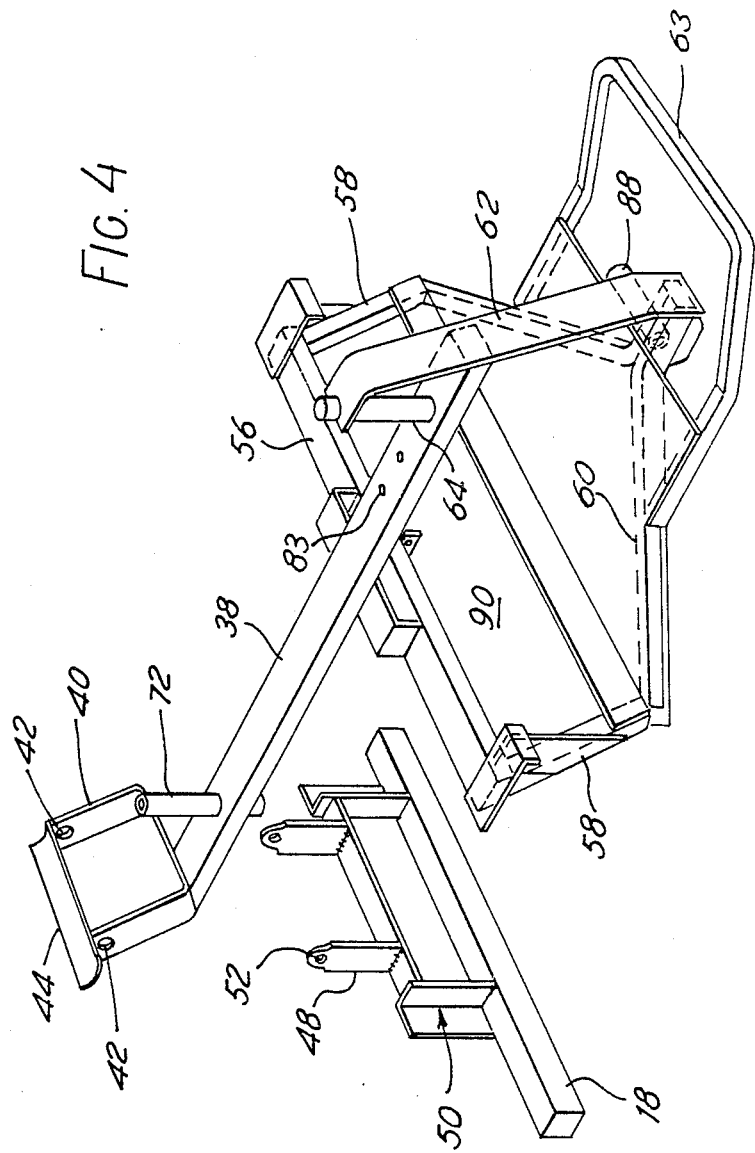

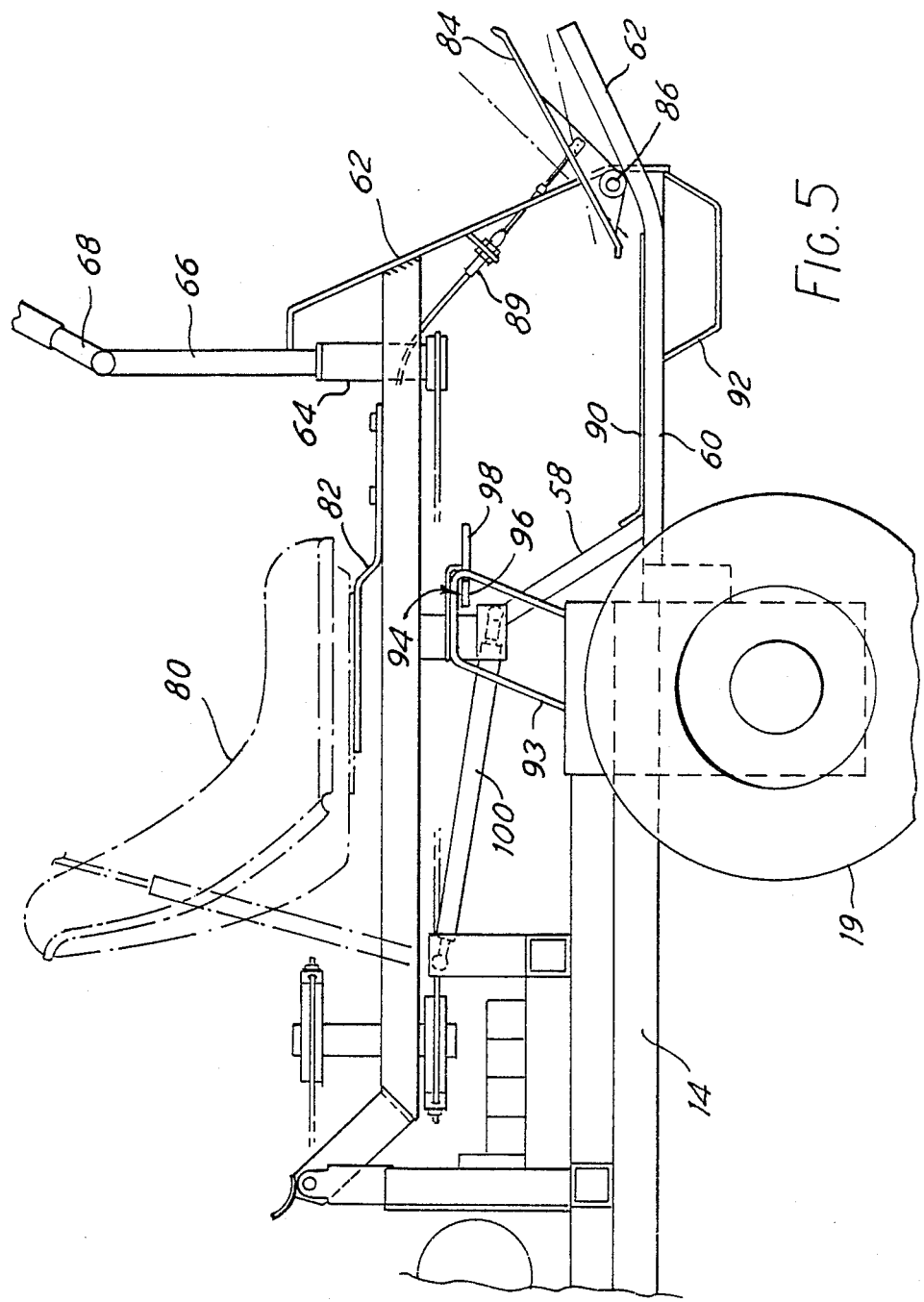

GRASS CUTTING MACHINE

BACKGROUND OF THE INVENTION

This invention relates to grass cutting machines and particularly to such machines having two front cutting units supported forwardly of respective front wheels of the machine and a rear cutting unit supported behind the front wheels and positioned so as to cut a swath left between the front cutting units. In self-propelled machines of this type, considerations such as weight distribution and overall compactness of construction, usually demand that the operator's seat be positioned generally above the rear cutting unit. Access to the rear cutting unit is therefore a problem, both for the purposes of removing the grass box for emptying and for adjusting and servicing the cutting unit.

In one known grass cutting machine, an attempt is made to overcome this problem by providing an opening in the chassis through which the grass box of the rear cutting unit may be withdrawn upwardly. In normal mowing operations the legs of the operator extend across this opening. It is still the case, however, that access to the rear unit is significantly less easy than with the front cutting units and this is particularly important where adjustment or other minor servicing work has to be undertaken. In such a case, the operator is required to work through the opening in the chassis. It is thought desirable, furthermore, to avoid a situation in which the legs of the operator extend over the cutting unit with no intervening chassis part or similar protection.

In one other known grass cutting machine of this type, access to the rear cutting unit is provided from the side of the machine. The rear grass box has to be withdrawn laterally and this may present difficulties, especially when the grass box is full of grass. There are, again, difficulties in obtaining the closer access that is required for adjustment and servicing.

It is an object of one aspect of this invention to provide an improved grass cutting machine in which the operator position is generally above a rear cutting unit but in which ready access is available to that unit.

SUMMARY OF THE INVENTION

Accordingly, the present invention consists in one aspect in a grass cutting machine comprising a chassis supported on two front wheels and at least one rear wheel; two front grass cutting units supported forwardly of the respective front wheels; a rear cutting unit supported behind the front wheels and positioned so as to cut the swath left between the front cutting units; propulsion means acting through at least one wheel for propelling the machine across the ground; and an operator position provided on the chassis, comprising a seat for the operator; characterized in that the operator position is provided on a sub-frame which is displaceable relative to the chassis to facilitate access to the rear cutting unit.

Advantageously, said sub-frame is pivotable upwardly with respect to the chassis from a working position to an access position.

According to another aspect of this invention, there is provided a grass cutting machine comprising a chassis supported on two front wheels and at least one rear wheel; two front grass cutting units supported forwardly of the respective front wheels; a rear cutting unit supported behind the front wheels and positioned so as to cut the swath left between the front cutting units and propulsion means acting through at least one wheel for propelling the machine across the ground, wherein the chassis comprises spaced forward chassis parts each supporting one front wheel and one front cutting unit, the rear cutting unit being positioned between the chassis parts and wherein there is provided a sub-frame displaceable from a working position in which it overlies the chassis parts and covers the rear cutting unit to an access position in which access may be had to the rear cutting unit between the forward chassis parts.

Advantageously, said subframe carries an operator position.

Suitably, the operator position comprises a steering control and foot pedal means provided on the sub-frame.

BRIEF DESCRIPTION OF THE DRAWINGS

The invention will now be described by way of example with reference to the accompanying drawings in which:

FIG. 4 is a perspective view of a sub-frame of the machine of FIG. 1, and FIG. 5 is a side view similar to FIG. 1 with certain parts removed for the sake of clarity.

DESCRIPTION OF THE PREFERRED EMBODIMENT

Figure 2:
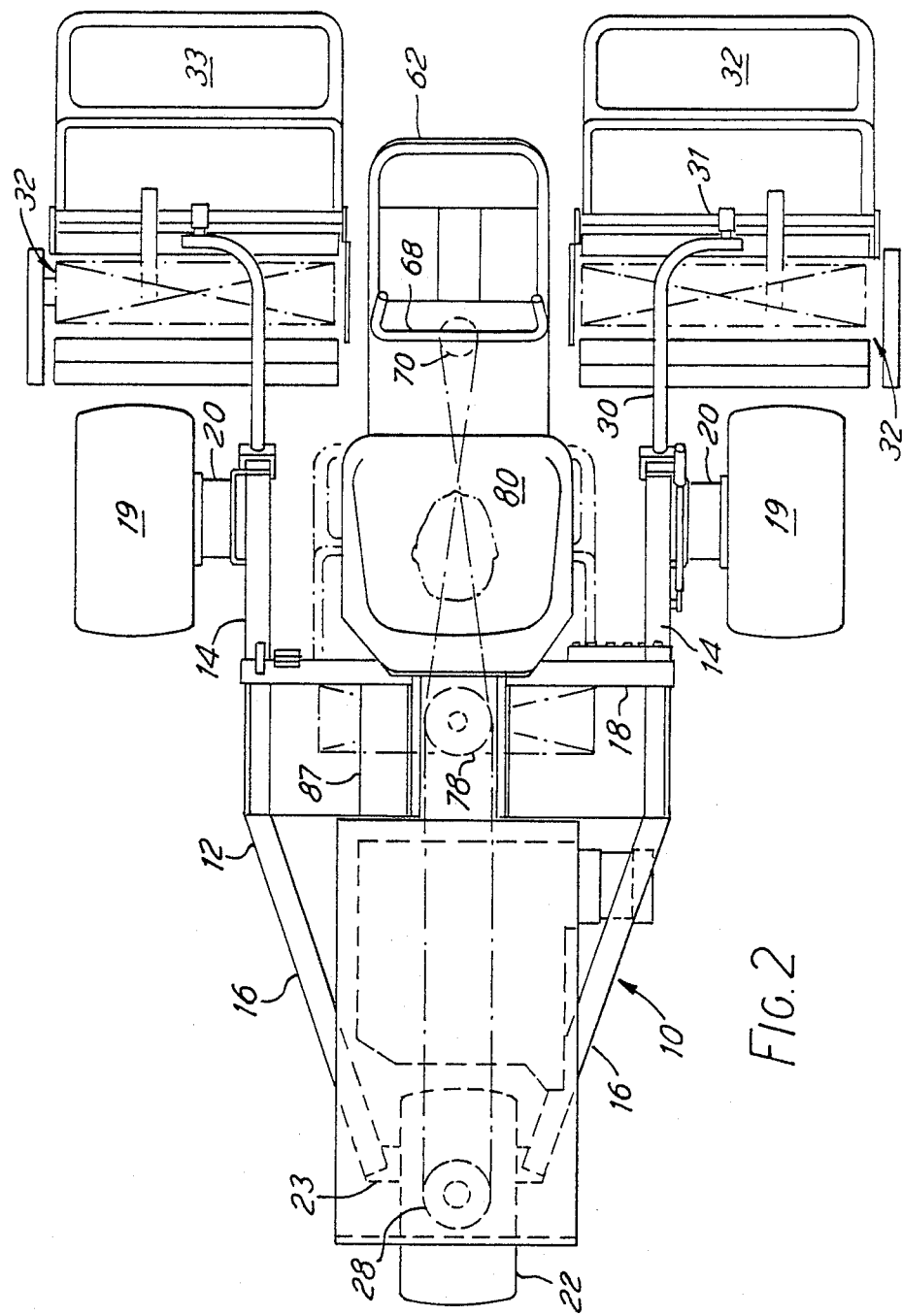
FIG. 2 is a plan view of the machine of FIG. 1.

The grass cutting machine shown in the drawings comprises (as best seen in FIG. 2) a chassis 10 having side chassis members 12 with parallel forward sections 14 and rearward sections 16 which are inclined inwardly and upwardly. A main lateral member 18 extends between the forward sections 14.

Figure 1:
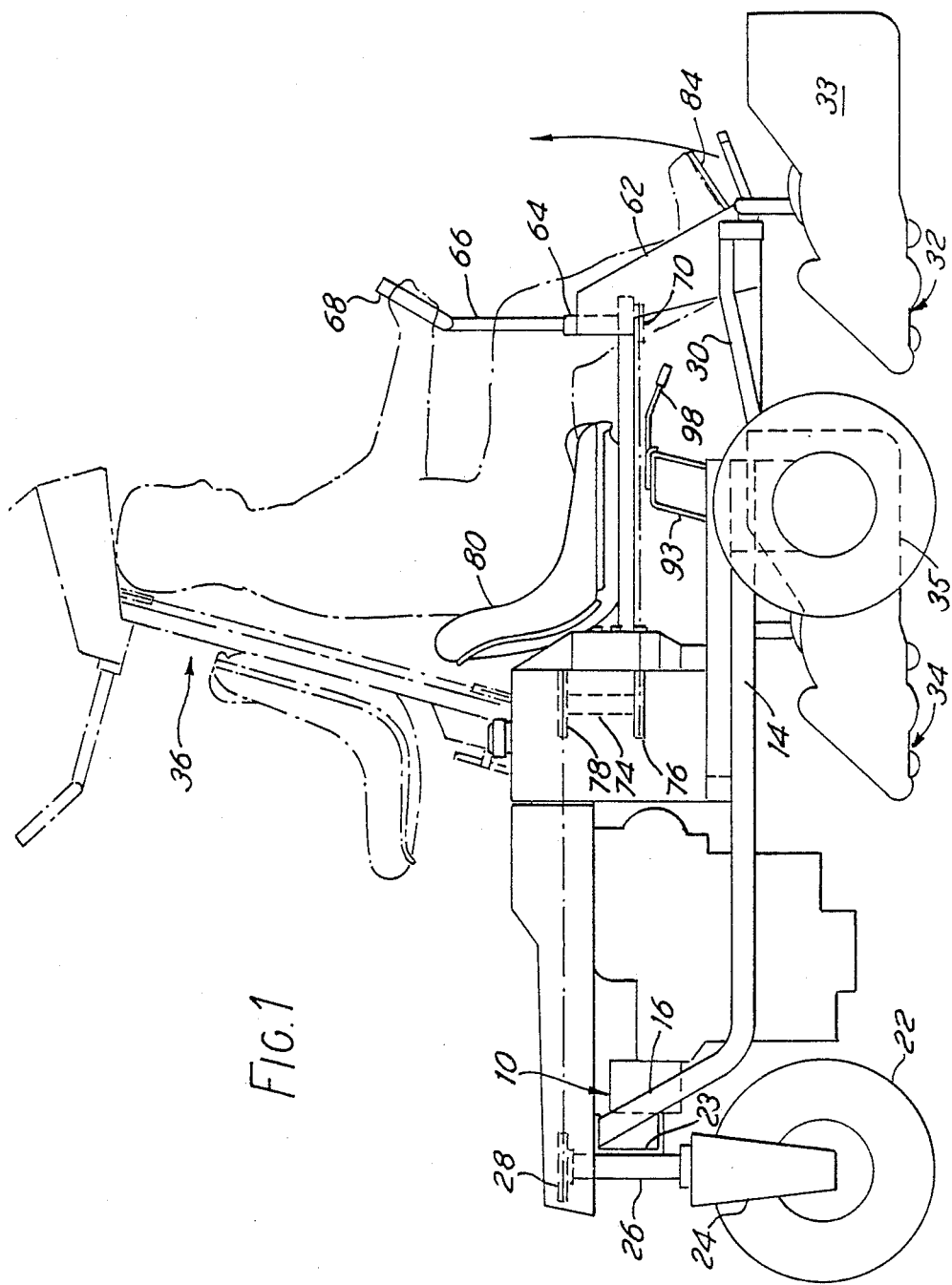
FIG. 1 is a side view of a grass cutting machine according to this invention.

Each forward chassis section 14 supports a front wheel 19 provided with a hydraulic drive motor 20. A steerable rear wheel 22 is supported from a cross piece 23 connecting the rearward chassis sections 16. As best seen in FIG. 1, the wheel 22 is mounted in a yoke 24 carried on a steering shaft 26. A cable pulley 28 is secured to the top of this shaft to enable steering, as will be described in more detail hereinafter.

Between the chassis members 12 there is supported an internal combustion engine and hydraulic pumps which are belt driven from the engine. The details of these components, which are entirely conventional, and the manner in which they are supported within the chassis, are not essential to the present invention and more detailed description is not considered necessary.

At the free end of each forward chassis section 14 there is pivotally mounted a cutting unit support arm 30 carrying a forward cutting unit 32 arranged for rocking movement about a fore and aft axis 31. The cutting unit may be of generally conventional form and includes a grass box 33. Means (not shown) are provided for pivoting the support arm upwardly to lift the cutting unit 32 to a transport position. A rear cutting unit 34 is positioned between the front chassis sections 14 and is suitably supported from the main lateral member 18, for example, through trailing links. This rear unit similarly includes a grass box 35 and is provided with means (not shown) for lifting the unit relative to the chassis.

The operator position is provided on a sub-frame shown generally at 36 which may be displaced relatively to the chassis. As shown best in FIG. 4, the sub-frame 36 comprises a central longitudinal member 38. At the rear end of this member, there is provided a U-shaped piece 40, the legs of which extend upwardly and rearwardly and are formed with apertures 42. The free ends of these legs are joined by a cable guide plate 44 the purpose of which will be described hereinafter. The lateral chassis member 18 has two upstanding support lugs 48 mounted on a raised platform 50. Pins pass through an aperture 42 in each lug 48 and through the aperture 42 in the corresponding leg of each U-shaped piece 40 to provide for pivotal mounting of the sub-frame about a transverse axis.

Towards the forward end of the longitudinal member 38, there is connected a transverse member 56 which carries forwardly and downwardly projecting arms 58 at its opposite ends. The arms 58 in turn support a horizontally disposed A-frame 60. A strap 62 extends upwardly and rearwardly from the apex of the A-frame 60 and is connected to the forward end of the longitudinal member 38. A U-shaped member 63 extends forwardly from the A-frame 60 with the legs of the member being secured to sides of the A-frame and the bight portion of the member tilted upwardly as seen best in FIG. 5.

Adjacent the front end of the longitudinal member 38, there is mounted a vertical bearing collar 64 which receives the steering column 66. It will be seen that the strap 62 extends upwardly and rearwardly from its point of connection with the longitudinal member 38 to form a bracing support for the bearing collar 64. The steering column 66 carries a suitably formed handle 68 at its upper end; the lower end carries a cable pulley 70. The handle 68 could of course be replaced by a steering wheel.

Adjacent its rear end, the longitudinal member 38 carries a similar bearing collar 72 in which is rotatably supported an intermediate steering shaft 74. At its lower end, this intermediate steering shaft carries a cable pulley 76 which is connected by cable to the pulley 70 on the steering column. A further cable pulley 78 provided at the upper end of the intermediate steering shaft 74 is similarly linked with the cable pulley 28 of the rear wheel shaft 26.

An operator's seat 80 of suitable form is mounted on a cranked seat support plate 82 which is bolted at its forward end to the longitudinal member 38 through bolt holes 83. The resilience of the cantilevered support plate 82 provides a degree of shock absorbtion in the seat mounting. Left and right foot pedals 84 on respective mounting shafts 86 are supported from a common bearing collar 88 provided at the forward end of the A-frame 60. One pedal serves in conventional manner to control the lifting and powering of the cutting units. The hydraulic valve block 87 controlling powering and lifting of the cutting units is solenoid operated so that a simple electrical connection suffices between the valve block and the foot pedal. The other pedal controls a closed circuit hydrostatic transmission which services to accelerate or decelerate the machine as determined by the position of the foot pedal. In this way, the need for a separate brake pedal is avoided although, for safety rasons, a separate parking brake (not shown) is mounted on the main chassis. The connection between the foot pedal and the hydrostatic transmission is achieved through a Bowden cable seen at 89 in FIG. 5. The sub-frame 36 is completed by a foot plate 90 of sheet metal which overlies the A-frame 60 and part of the U-shaped member 62, and by a pull-down handle 92 shown best in FIG. 5.

During normal mowing operation, the ends of the transverse member 56 engage abutments 93 provided on the respective forward chassis sections 14. To prevent accidental movement of the sub-frame, a latching arrangement shown generally at 94 is provided. This arrangement comprises a lever 96 which is supportd from the transverse member 56 for rotation about a vertical axis by means of a handle 98. Elongated latching rods (not shown) are pivotally connected to opposite ends of the lever 96 and extend transversely to engage (in the closed position) beneath the abutments 93. It will be appreciated that movement of the handle 98 through approximately 90° will serve to withdraw both latching rods inwardly, thus releasing the sub-frame. Using the central portion of the U-shaped member 63 as a hand grip, the operator may lift the entire sub-frame about the pivot axis defined by pins 51 to an access position shown in dot dash outline in FIG. 1. A gas strut 100 extending from the main chassis to an anchorage beneath the transverse member 56 of the sub-frame assists this upward movement and suitable latching means (not shown) are provided for locking the sub-frame in the access position.

Figure 3:
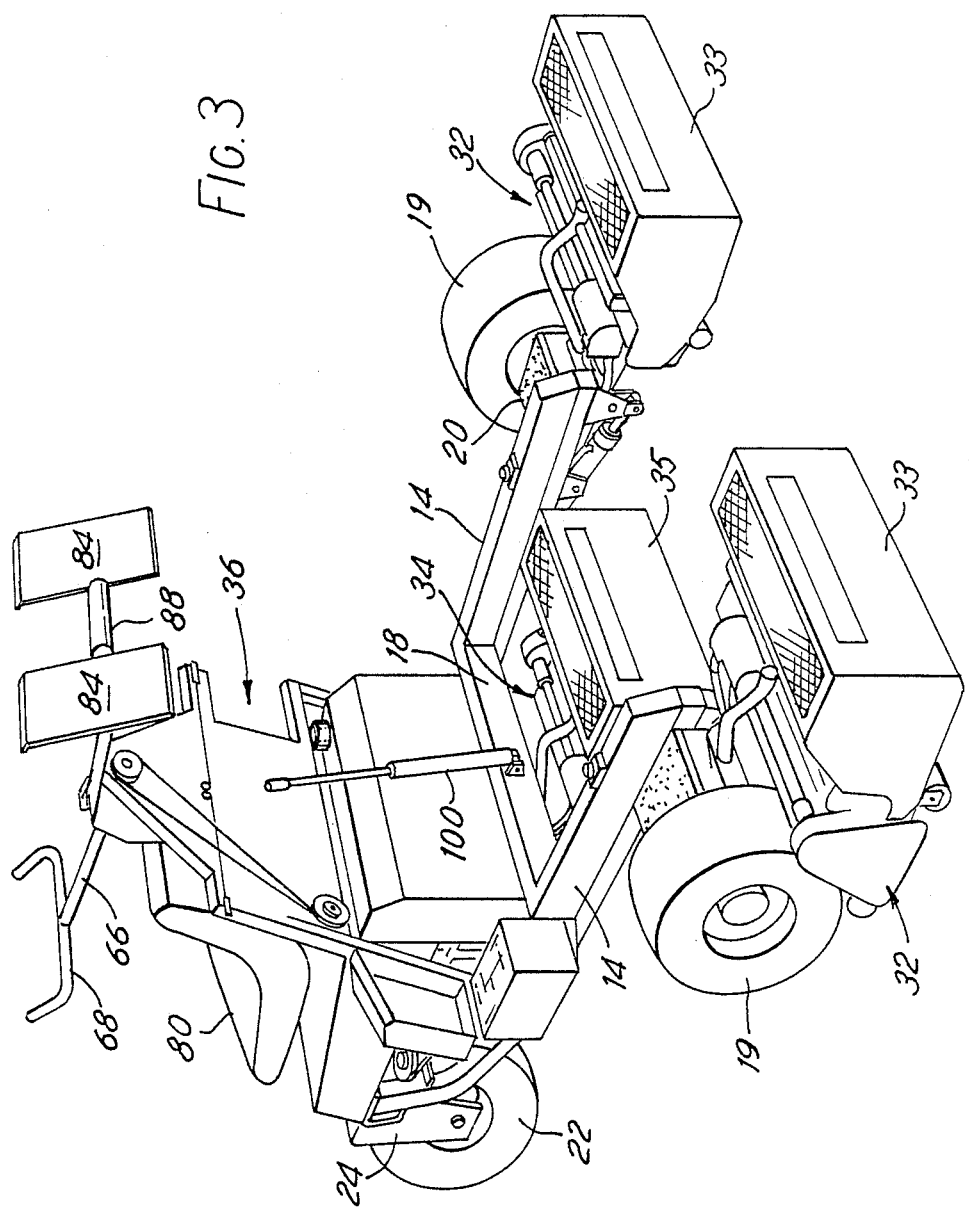
FIG. 3 is a perspective view of a machine similar to that of FIG. 1 but illustrating a different position.

As seen best from FIG. 3, when the sub-frame is in the access position, it is quite possible for the operator to walk between the forward cutting units 32 and the forward chassis sections 16 to gain access to the rear cutting unit 34. The grass box 35 can be withdrawn either vertically or forwardly depending upon the manner of location and operator convenience. With the grass box removed, adjustment and minor servicing of the rear cutting unit can be achieved as simply as with either of the front cutting units. Moreover, the rear cutting unit itself can be removed, if so desired, by withdrawing it forwardly between the forward chassis sections.

Since intermediate steering shaft 74 is provided on the sub-frame, the cable connection offers no hindrance to the upward movement to the access position. In order to prevent undue slackness in the secondary cable in the access position, the described cable guide plate 44 is positioned to engage the cable so that the effective cable run is unchanged in length. The Bowden cable connection to the hydrostatic transmission and the electrical connection to the hydraulic valve blocks are similarly adapted to allow for the movement of the foot pedals that occurs on raising of the sub-frame to the access position.

This invention has been described by way of example only and a variety of modifications are possible without departing from the scope of the invention. Thus, for example, whilst the described method of pivoting the operator position sub-frame rearwardly and upwardly is felt to have important advantages, other means may be provided for displacing the operator position relative to the main chassis to gain access to the rear cutting unit. One alternative is illustrated in FIG. 3 where the pivotal connections to the sub-frame is made through rearwardly extending side members rather than through a central member. In other embodiments, the sub-frame may be pivoted upwardly and sidewardly about a longitudinal axis or sliding or other forms of connection between the sub-frame and the chssis may be used.

Similary, whilst there is thought to be considerable advantage in providing both the steering control and the foot pedals on the pivotable sub-frame, it will be possible in other arrangements to position these items on the main chassis part.

In another embodiment, the sub-frame may be used to accommodate the fuel and hydraulic fluid tanks with the area on the main chassis formerly occupied by those items then becoming available for the operator position.

What is claimed is:

1. A grass cutting machine comprising:
   a chassis supported on two front wheels and at least one rear wheel;
   two front grass cutting units supported forwardly of the respective front wheels;
   a rear cutting unit supported between the front wheels and positioned so as to cut a swath left between the front cutting units;
   propulsion means acting through at least one of said wheels for propelling the machine across the ground;
   a subframe provided on the chassis and carrying a seat for an operator and steering control and foot pedal means for controlling said propelling; and
   means for operatively displacing said subframe relative to the chassis to provide access to the rear cutting unit.

2. A grass cutting machine according to claim 1, wherein said means for operatively displacing said subframe includes a transverse axis, and said subframe is pivotable relative to the chassis about said transverse axis.

3. A grass cutting machine according to claim 1, wherein the chassis comprises spaced forward chassis parts each supporting one front wheel and one front cutting unit, the rear cutting unit being positioned between the chassis parts, wherein the sub-frame is displaceable from a working position in which it overlies the chassis parts and covers the rear cutting unit to an access position in which access may be had to the rear cutting unit between the forward chassis parts.

4. A grass cutting machine comprising:
   a chassis supported on two front wheels and at least one rear wheel;
   two front grass cutter units supported forwardly of the respective front wheels;
   a rear cutting unit supported behind the front wheels and positioned so as to cut the swath left between the front cutting units;
   propulsion means acting through at least one wheel for propelling the machine across the ground;
   wherein the chassis comprises spaced forward chassis parts each supporting one of said front wheels and one of said front cutting units, said rear cutting unit being positioned between said chassis parts; and
   wherein there is provided a subframe and means for displacing said subframe from a working position in which it overlies said chassis parts and covers said rear cutting unit to an access position in which access may be had to the rear cutting unit between the forward chassis parts.

5. A grass cutting machine according to claim 4, wherein said sub-frame carries a seat for an operator.

6. A grass cutting machine according to claim 4, wherein the subframe further carries a steering control and foot pedal means.

7. A grass cutting machine according to claim 4, wherein the spaced forward chassis parts define between them a space which is open to the front of the machine.

8. The grass cutting machine of claim 4, wherein said means for displacing said subframe allows said subframe to be pivotally rotated with respect to said chassis upwardly and away from said rear cutting unit, to provide said access to said rear cutting unit.

9. A grass cutting machine comprising:
   a chassis having a rear chassis part and two transversely spaced forward chassis parts;
   at least one rear wheel supported from said rear chassis part;
   two front wheels, supported respectively from said forward chassis parts;
   two front grass cutting units mounted respectively on said forward chassis parts and positioned forwardly of the corresponding front wheels;
   a rear cutting unit supported behind the front wheels and positioned so as to cut a swath left between the front cutting units;
   propulsion means acting through at least one of said wheels for propelling the machine across the ground;
   a subframe carrying a seat for an operator; and
   means supporting said subframe and mounted on the chassis in such a manner as to be displaceable from a working position, in which said subframe overlies the forward chassis parts and covers the rear cutting unit, to an access position in which walk-in access may be had to the rear cutting unit between the forward chassis parts.

10. A grass cutting machine according to claim 9, wherein said means for supporting said subframe includes a transverse axis, and said subframe is pivotally mounted on the chassis by rotational movement about said transverse axis.

* * * * *